United States Patent
DeCenzo et al.

(10) Patent No.: US 7,375,923 B2
(45) Date of Patent: May 20, 2008

(54) HIGH SPEED AND HIGH CAPACITY DATA STORAGE ARRAY

(75) Inventors: David Peter DeCenzo, Pueblo, CO (US); Fred Wayne Flournoy, Colorado Springs, CO (US); Erik Riedel, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 362 days.

(21) Appl. No.: 11/141,493

(22) Filed: May 31, 2005

(65) Prior Publication Data

US 2006/0268444 A1    Nov. 30, 2006

(51) Int. Cl.
   *G11B 33/14*   (2006.01)
   *G06F 1/16*    (2006.01)

(52) U.S. Cl. ............................ 360/97.02; 360/73.01; 361/687

(58) Field of Classification Search ............ None
   See application file for complete search history.

(56) References Cited

U.S. PATENT DOCUMENTS

| | | |
|---|---|---|
| 3,703,713 A | 11/1972 | Pohm et al. |
| 4,454,566 A | 6/1984 | Coyne |
| 5,214,567 A | 5/1993 | Feightner et al. |
| H1221 H | 8/1993 | Best et al. |
| 5,243,479 A | 9/1993 | Nakagoshi et al. |
| 5,422,767 A | 6/1995 | Hatchett et al. |
| 5,432,766 A | 7/1995 | Ando et al. |
| 5,965,992 A | 10/1999 | Goretzki et al. |
| 6,262,545 B1 | 7/2001 | Yamamoto |
| 6,490,123 B1 | 12/2002 | Okunaga et al. |
| 6,535,381 B2 | 3/2003 | Jahnet et al. |
| 6,622,252 B1 | 9/2003 | Klaassen et al. |
| 7,200,008 B1* | 4/2007 | Bhugra ................ 361/685 |
| 2002/0093760 A1 | 7/2002 | Okunaga et al. |
| 2003/0043495 A1 | 3/2003 | Mayer |

(Continued)

FOREIGN PATENT DOCUMENTS

EP    0915468 A1    5/1999

(Continued)

OTHER PUBLICATIONS

Edward G. Grochowski, Roger F. Hoyt, & John S. Heath, "Magnetic Hard Disk Drive Form Factor Evolution," Proceedings of the 1993 JASME International Conf. On Advance Mechanics, (Aug. 31, 1993).

*Primary Examiner*—William Korzuch
*Assistant Examiner*—Jason Olson
(74) *Attorney, Agent, or Firm*—David K. Lucente

(57) ABSTRACT

A data storage array is provided such as for a distributed storage system or a consumer electronics device wherein increased data storage capacity is provided at the cost of increased power consumption in relation to industry standard power consumption rates. The array has a plurality of data storage devices, each having an actuator operably disposed in a data storing and retrieving relationship with a data storage medium. The data storage medium is rotated at a speed of substantially greater than 10,000 revolutions per minute, and each of the data storage mediums has a data storage capacity of substantially greater than 100 gigabytes. The increased heat created by the relatively faster rotation speed is handled through improved airflow made possible by a multiple device array constructed in accordance with embodiments of the present invention.

15 Claims, 4 Drawing Sheets

U.S. PATENT DOCUMENTS

2003/0174428 A1    9/2003    Sakamoto

FOREIGN PATENT DOCUMENTS

| | | |
|---|---|---|
| JP | 04-205776 | 7/1992 |
| JP | 406044743 A | 2/1994 |
| JP | 407302482 A | 11/1995 |
| JP | 2002074811 A | 3/2002 |
| JP | 2004139724 A * | 5/2004 |

\* cited by examiner

HIGH SPEED AND HIGH CAPACITY DATA STORAGE ARRAY

FIELD OF THE INVENTION

The claimed invention relates generally to the field of data storage and more particularly, but not by way of limitation, to an apparatus and method for storing data in a bulk storage array within a distributed storage system.

BACKGROUND

Distributed storage systems use hardware such as a central processing unit (CPU), one or more disc controllers, and a plurality of data storage arrays providing bulk storage. Computer program code operating on the CPU and/or disc controllers controls the manner in which user data is stored and accessed on the bulk storage. User data can be stored in various fault tolerant schemes, such as in redundant array of independent drive (RAID) formats, for example. Multiple RAID formats can advantageously be employed concurrently within the data storage system. The rate at which the bulk storage can be dynamically allocated, as well as the amount of available storage capacity, both significantly contribute to the marketability of the storage system.

The first direct access storage device, IBM's RAMAC in 1957, had a 5 megabyte storage capacity existing on fifty 24 inch data storage discs. By the 1980s, the rate at which areal density capabilities progressed yielded a single 5.25 inch disc with the same 5 megabyte storage capacity. The industry has continued to evolve into ever-smaller form factors according to a standardized scaling methodology. Today, the 5.25 inch form factor is obsolete, having been replaced with the 3.5 inch and 2.5 inch form factors, and more recently with sub 1.8 inch form factors.

The evolution driving the scaling methodology has been skewed by the proliferation of consumer computer products employing the disc drives. That is, increased areal density has permitted decreased disc size, without penalty to storage capacity, and rotated at increased velocity with potentially reduced or constant power consumption. The increased rotational speed increases processing performance by reducing latency lags. The smaller size actuators offer improved seek time performance.

In continually pushing to make the discs smaller and spin them faster, power consumption has in fact become the baseline standardization design point, limiting the number of discs and the speed at which the discs can be rotated without exceeding a reliable operating temperature.

Accordingly, data storage arrays providing bulk storage have followed the same evolutionary path—that of seeking to continually reduce the size of the storage discs without loss of storage capacity in order to pack more drives within the array. In other words, the evolutionary goal has been to increase the spindle density within the array. However, as improvements in areal density have slowed, the demand for more capacity and faster processing capability by distributed storage systems remains a market factor. What is needed is a solution that optimizes both the processing speed and the storage capacity as primary design points, wherein power consumption and the associated heat dissipation becomes a tertiary consideration. It is to these improvement features that the embodiments of the present invention are directed.

SUMMARY OF THE INVENTION

Embodiments of the present invention are generally directed to a data storage array subsystem for a distributed storage system.

In some embodiments a data storage array is provided for a distributed storage system. The array has a plurality of data storage devices, each having an actuator operably disposed in a data storing and retrieving relationship with a data storage medium. The data storage medium is rotated at a speed of substantially greater than 10,000 revolutions per minute, and has a data storage capacity of substantially greater than 100 gigabytes.

In some embodiments a method is provided for storing data in a distributed storage system. The method includes providing the plurality of data storage devices, each having an actuator operably disposed in a data storing and retrieving relationship with a data storage medium rotating at a speed of substantially greater than 10,000 revolutions per minute, and having a data storage capacity of substantially greater than 100 gigabytes; placing the plurality of data storage devices in a multiple device array that is removably engageable in a cabinet for providing bulk storage to the distributed storage system; and forcing a fluid flow over the multiple device array for dissipating heat generated during operation of the data storage devices.

In some embodiments a distributed data storage system is provided comprising a host, and means for transferring data to and from bulk storage in response to commands from the host.

These and various other features and advantages which characterize the claimed invention will become apparent upon reading the following detailed description and upon reviewing the associated drawings.

DETAILED DESCRIPTION

Figure 1:
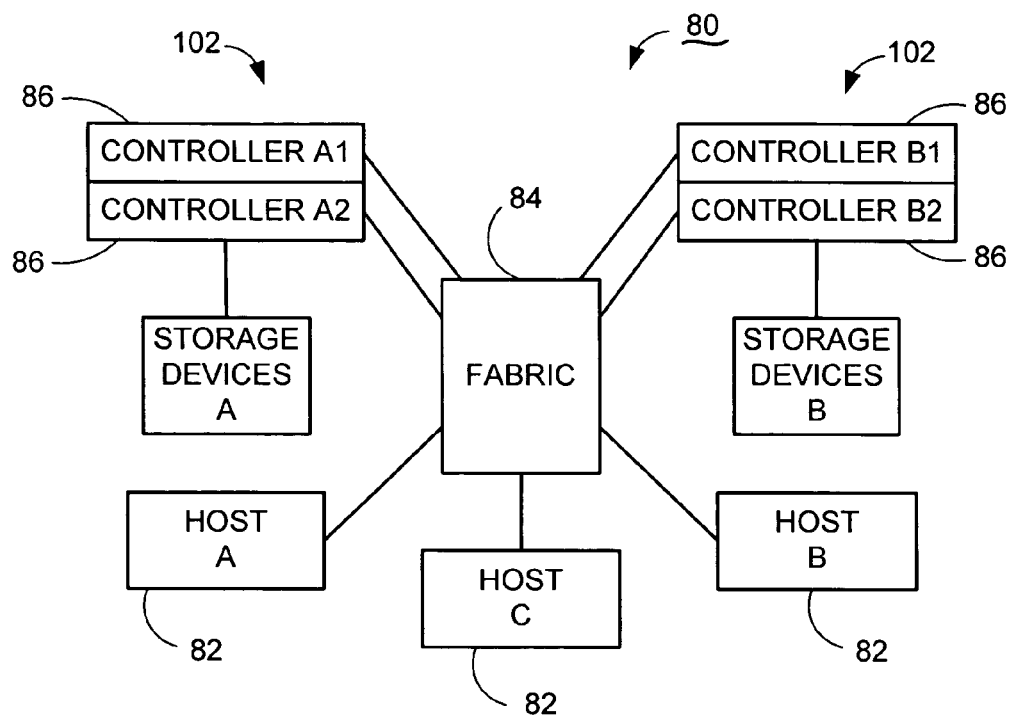
FIG. 1 is a diagrammatic illustration of a distributed storage system in which embodiments of the present invention are adaptable.

To illustrate an exemplary environment in which presently preferred embodiments of the present invention can be advantageously practiced, FIG. 1 shows a computer-based system 80 characterized as a storage area network (SAN), or more generally referred to as a distributed storage system, utilizing mass storage.

The system 80 includes a number of host computers 82, respectively identified as hosts A, B, and C. The host computers 82 interact with each other as well as with a pair of data storage arrays 102 (denoted A and B, respectively) via a fabric 84. The fabric 84 is preferably characterized as fibre-channel based switching network, although other configurations can be utilized as well, including the Internet.

Each array 102 includes a pair of controllers 86 (denoted A1, A2 and B1, B2) and a set of data storage devices preferably characterized as disc drives operated as a RAID. The controllers 86 and data storage devices preferably utilize a fault tolerant arrangement so that the various controllers 86 utilize parallel, redundant links and at least some of the user data stored by the system 80 is stored in a redundant format within at least one set of the data storage devices.

It is further contemplated that the A host computer 82 and the A data storage array 102 can be physically located at a first site, the B host computer 82 and B storage array 102 can be physically located at a second site, and the C host computer 82 can be yet at a third site, although such is merely illustrative and not limiting.

Figure 2:
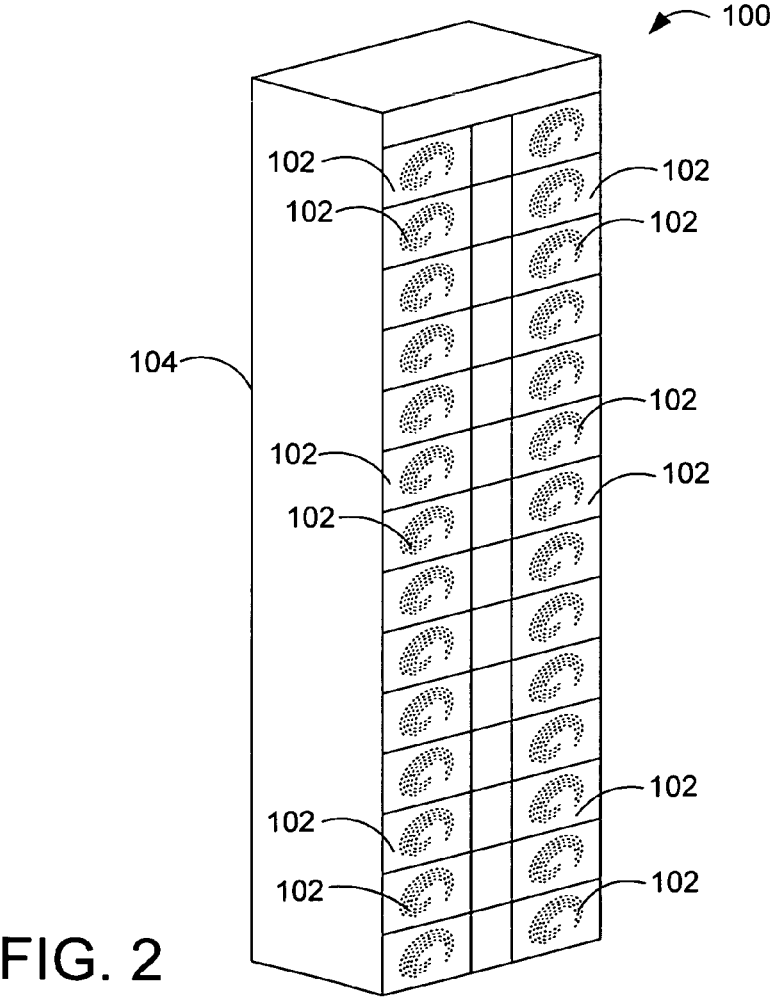
FIG. 2 is an isometric view of a storage array comprising the storage devices of FIG. 1.

Turning now to FIG. 2 which is an isometric view of an array storage system 100 constructed in accordance with novel embodiments of the present invention, to include a unitarily packaged plurality of the arrays 102. Because each array 102 contains a plurality of data storage devices, they are sometimes referred to herein as a multiple device array ("MDA") module. The MDA modules are also sometimes referred to herein as "storage bricks" of data storage capacity. An MDA module generally has a convertible plurality of componentized data storage devices, such as disc drive devices. By "convertible" it is meant that one or more data storage devices can be readily replaced, added, or removed in an existing MDA module, or that a different MDA module can readily be swapped with a different MDA module that is capable of supporting a different number, size or arrangement of data storage devices. By "componentized" it is meant that the data storage devices and associated control electronics in the MDA module are integrated so as to be functionally presented to the distributed storage system as a single logical entity.

Figure 3:
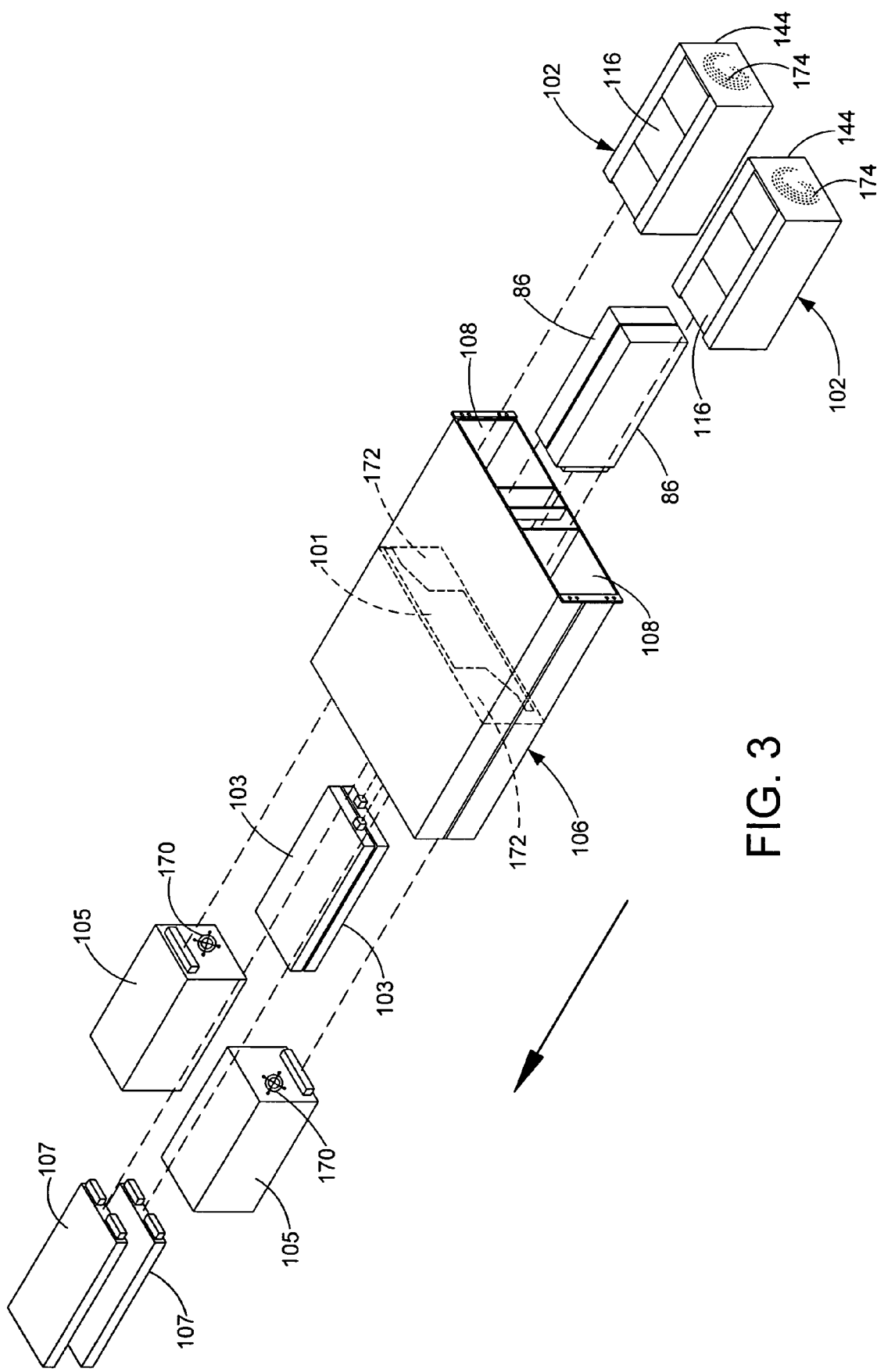
FIG. 3 is an exploded isometric view of a multiple device array and associated power and control components contained in a shelf of the storage array of FIG. 2.

A cabinet 104 supports a plurality of shelves that support, in turn, the MDA modules. FIG. 3 is an exploded isometric illustration of a shelf 106 that is constructed in accordance with embodiments of the present invention. Each shelf 106 defines one or more cavities 108 into each of which an MDA module is removably disposable to present bulk data storage to the distributed storage system. In the illustrative embodiment of FIG. 3, the shelf 106 defines two cavities 108 for receiving two MDA modules Equivalent alternative embodiments contemplate a different number of MDA modules per shelf 106.

The MDA modules electrically engage a backplane 101 for communicating within the distributed storage system. The controllers 86 connect to the same side of the backplane 101. Additionally, battery units 103, power supply units 105, and interface units 107 connect to the opposing side of the backplane 101.

Figure 4:
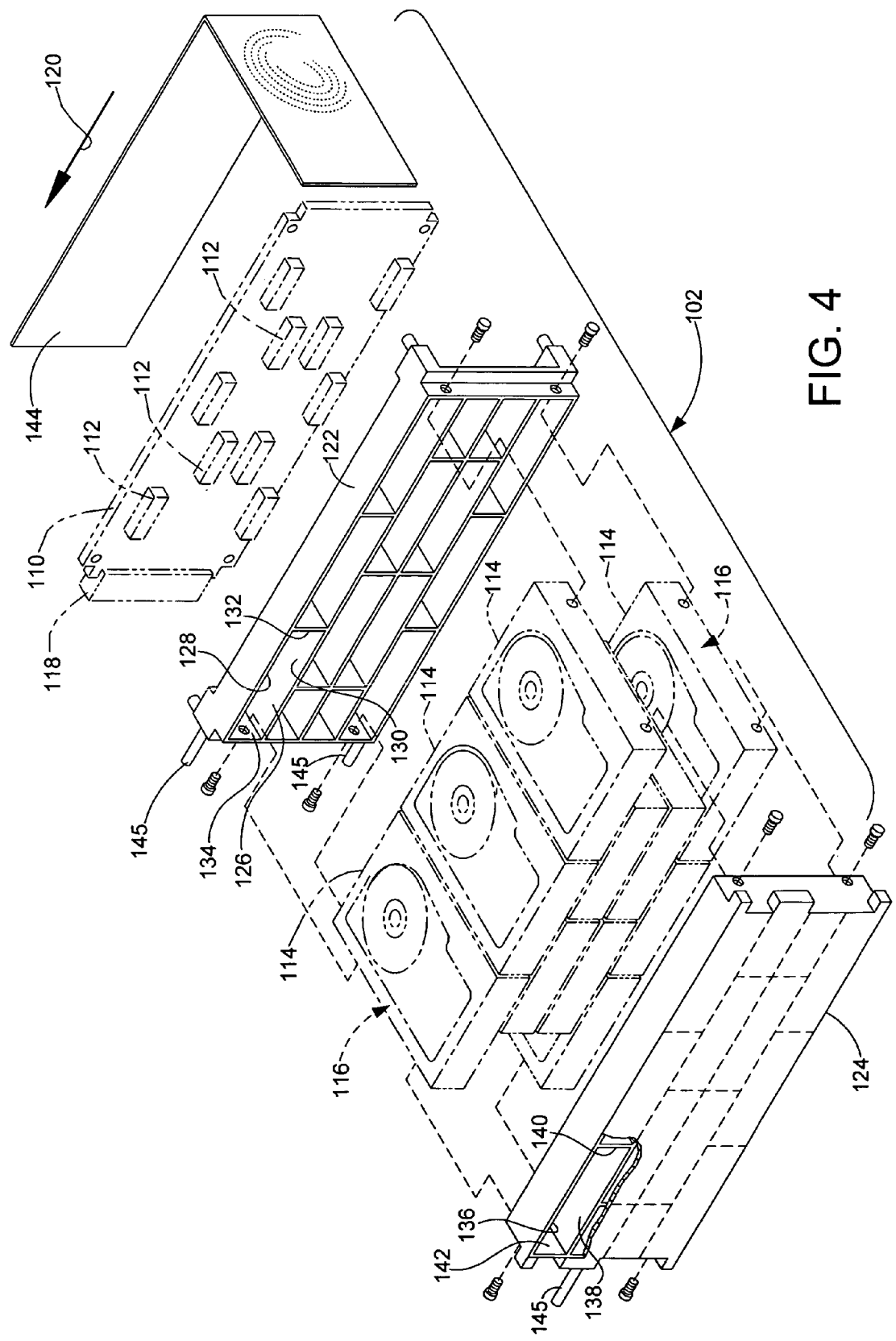
FIG. 4 is an enlarged and exploded isometric view of the multiple device array portion of FIG. 3.

FIG. 4 is an exploded isometric view illustrating an MDA module in the form of a carrier constructed in accordance with embodiments of the present invention. The carrier 103 supports a circuit board 110 with a plurality of connectors 112 arranged to align with connectors 114 of corresponding data storage devices 116. The circuit board 110 preferably further comprises a connector 118 that is adapted to connect to the electronics backplane 101. It will be noted that in the illustrative arrangement of FIG. 4, the connector 118 is advantageously aligned for an operable connection with the backplane 101 by moving the circuit board 110 in a direction 120 along the longitudinal depth of the shelf 106 (FIG. 3). In this manner, the electrical connection between the circuit board 110 and the array storage system 100 is readily made as a result of inserting the carrier 103 into the shelf 106. The circuit board 110 is selectively configured such that upon operative insertion of the carrier 102, a host 82 of the distributed storage system can be placed in electrical communication with each and every data storage device 116 in the MDA module, and the data storage devices 116 can be placed in electrical communication with other data storage devices 116 both inside and outside a particular MDA module.

In embodiments contemplated in FIG. 4 and below, the carrier 103 has a two-piece supporting construction wherein the data storage devices 116 are sandwiched between a partition member 122 and an opposing cap member 124. This construction has been determined to offer advantageous manufacturing and component cost benefits. The partition 122 and cap 124 in this illustrative arrangement are well suited for manufacture by conventional die casting methodology to provide relatively inexpensive yet structurally robust component parts. Alternatively, the MDA 102 can comprise a unitary ("one-piece") construction or can comprise an assembly of more than two components.

The partition 122 comprises channel surfaces defining a number of channels 126, within each of which a data storage device 116 is slidingly engageable and operatively alignable with the circuit board 110. For example, the partition 122 comprises a first pair of opposing surfaces 128, 130 that are spaced-apart defining an operable mating relationship with a cross-sectional height of the data storage device 116. The partition 122 comprises a second pair of opposing surfaces 132, 134 that are spaced-apart defining an operable mating relationship with a cross-sectional width of the data storage device 116. The two pair of opposing surfaces 128, 130 and 132, 134 thereby define a tubular closed passage circumscribing a cross section of a data storage device 116. A close mating relationship between the surfaces 132, 134 and 128, 130 and the data storage device 116 imparts a supporting engagement to the data storage device 116. This supporting relationship is such that lateral support is imparted to the data storage device 116 by the partition 122 in all directions. This is particularly beneficial in supporting the data storage devices 116 in the face of internal and external excitations.

In the two-piece supporting construction of FIG. 4, the channel 126 defined by the partition 122 supportingly engages a proximal end of the data storage device 116 adjacent the circuit board 110. The channel 126 is continued in the cap 124 by discontinuous surfaces 136, 138 and 140, 142 that similarly supportingly engage a distal end of the data storage device 116.

In this arrangement a medial portion of the data storage devices 116 provide structural integrity to the carrier 103. Although not shown, in alternative equivalent embodiments the carrier 103 can comprise a one-piece construction, or can be provided with attachment portions of the partition 122 and cap 124 for joining them together directly, or attachment linkages can be provided for doing so.

Back to FIG. 3, the carrier 103 can include a wrapper 144 for enclosing the data storage devices 116 and/or the circuit board 110, such as for electrical shielding. The illustrative wrapper 144 of FIG. 4 covers just the front and circuit board 110 portions of the MDA module.

The carrier 103 of FIG. 4 defines ten channels 126 for receivingly engaging ten data storage devices 116. In alternative equivalent embodiments the channels 126 could be arranged in four rows of three to receivingly engage twelve data storage devices 116 within the same size carrier 103. These embodiments contemplate a 3.5 inch form factor data storage device 116. In other alternative equivalent embodiments the channels 126 can be sized for a 2.5 inch form factor, such that as many as twenty-four data storage devices 116 have been accommodated within the same size carrier 103 as that discussed above. In still further equivalent alternative embodiments the channels 126 can be appropriately sized to supportingly engage more than one size data storage device 116.

In the manner described, the data storage devices 116 are sandwiched between the partition 122 and the cap 124 within a channel 126. The cap 124 urges the data storage device 116 toward the circuit board 110 in order to supportingly engage the data storage device 116 and to positively retain the electrical connection between the connector 114 (of the data storage device 116) with the connector 112 (of the circuit board 110). To enhance the supporting engagement a resilient member (not shown) can be compressingly interposed between the cap 124 and the distal end of the data storage device 116.

The carrier 103 preferably comprises one or more guide members that are adapted for aligning with mating features in the backplane 101 for positive alignment during insertion. In FIG. 4, for example, a three-point positive alignment is provided by two alignment pins 145 depending from the leading edge of the partition 122 and a third alignment pin 145 likewise depending from the cap 124.

Figure 5:
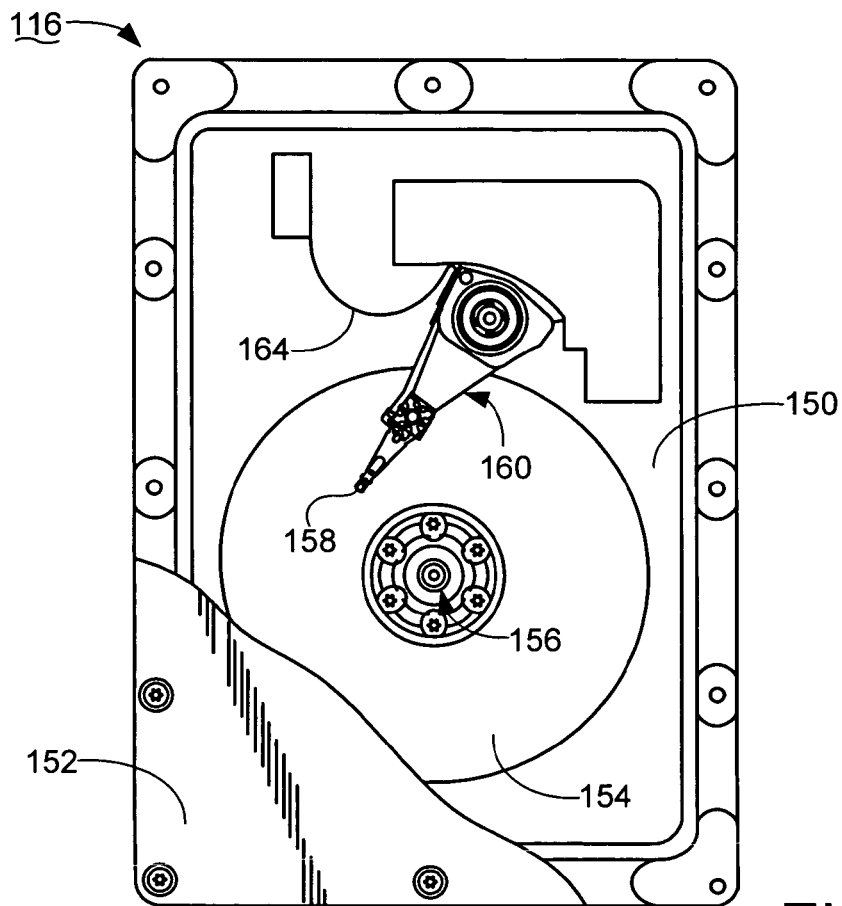
FIGS. 5 and 6 are plan and isometric views, respectively, of a data storage device constructed in accordance with embodiments of the present invention.
Figure 6:
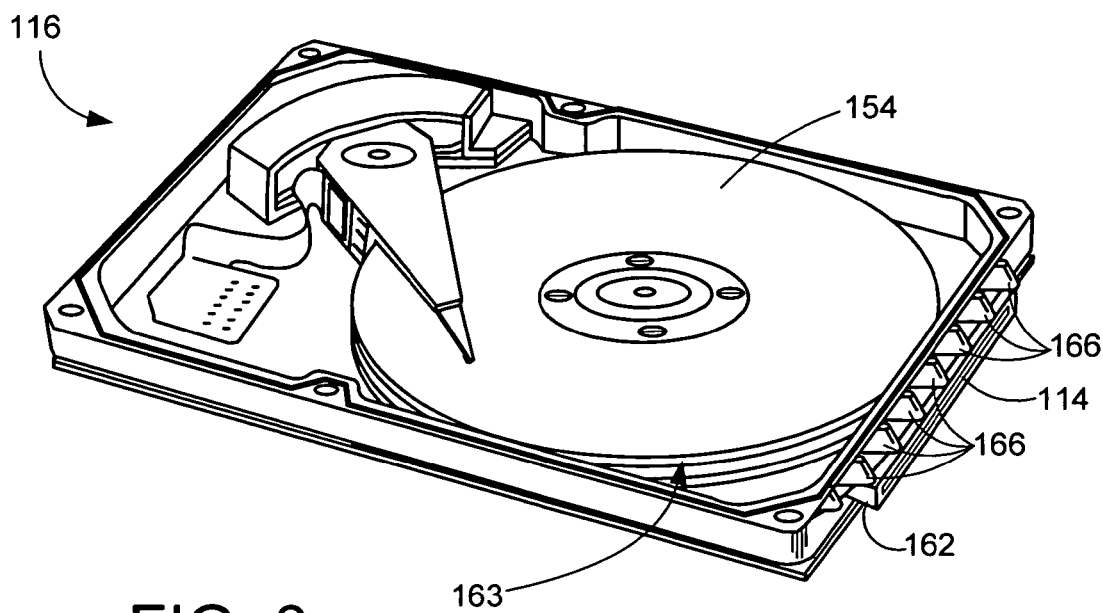

FIGS. 5 and 6 are plan and isometric views, respectively, of a data storage device 116 constructed in accordance with embodiments of the present invention and used in the data storage array 100 to optimize both the processing speed and the storage capacity available to the distributed storage system. In illustrative embodiments the data storage device 116 has a housing formed by a base 150 and a cover 152 (partially cutaway) defining a 3.5 inch form factor. That is, the housing has a standard-sized footprint of 101.6 millimeters (mm) wide and 146 mm long, and a standard-sized height of 41.3 mm. A data storage disc 154 has a diameter of 85 mm and is rotated at 15,000 revolutions per minute by a motor 156 to present locations of the disc 154 to a data storing and retrieving head ("head") 158. The head 158 is supported at the distal end of a rotary actuator 160 that is capable of moving the head 158 radially between inner and outer tracks of the disc 154. The head 158 is electrically connected to a circuit board 162 by way of a flex circuit 164. The circuit board 162 is adapted to receive and send control signals controlling the functions of the data storage device 116. The connector 114 is electrically connected to the circuit board 162.

A disc stack 163 of four discs 154 in this arrangement provides a total storage capacity of 146 gigabytes. This is a 100% increase in storage capacity in comparison to the industry standard 65 mm disc used in a 15,000 RPM, 3.5 inch form factor disc drive. The gains in processing speed and capacity, however, are realized at the penalty of increased power consumption. It has been observed that about a 50% increase in power consumption, from about 22 Watts to about 33 Watts, is experienced by increasing the disc 154 diameter from 65 mm to 85 mm and spinning it at 15,000 RPM.

To aid in dissipating the additional heat generated by the increased power consumption, the base 150 can define heat exchanger fins 166 extending outwardly into the air space surrounding the data storage device 116. The fins 166 are possible because the full length and width of the 3.5 inch form factor is not necessary for the 85 mm discs 154. Conventionally, the full width of the 3.5 inch form factor accommodates 95 mm diameter discs for use in disc drives operating at 10,000 RPM and less.

In addition to the heat exchanger fins 166, a forced airflow over the data storage devices 116 is necessary to dissipate sufficient heat energy to maintain an acceptable temperature, such as about 60.degree. C. in the data storage device 116. FIG. 3 best illustrates the use of a cooling fan 170 in each of the power supplies 105 that directs an airflow in a direction toward the carriers 103. By providing notches 172 in the backplane 101, the airflow passes over the data storage devices 116, and thereby convectively cools them. The cooling air is ultimately expelled through a plurality of vent openings 174 in the cover 144.

By increasing the disc size from the standard 65 mm to 85 mm in a 15,000 RPM application, the storage capacity is doubled. This represents a significant reduction in cost of manufacturing per gigabyte of storage capacity. The commensurate power draw increases by about 50%. Therefore, for a 50% increase in power consumption the embodiments of the present invention deliver a 100% increase in data storage capacity. No other significant costs are encountered beyond the cost of generating more power, which is about twenty-five cents per Watt, so ultimately the cost per gigabyte of storage capacity is effectively reduced by 50%.

The particulars of the examples discussed are illustrative and not limiting of the embodiments of the present invention. For example, in alternative equivalent embodiments data storage devices with 95 mm discs could be rotated at 10,000 RPM, or an 85 mm disc could be rotated at 15,000 RPM, or other such examples yielding relatively higher data storage capacity at the cost of increased power consumption.

Generally, the embodiments of the present invention contemplate a data storage array (such as 102) for a distributed storage system comprising a plurality of data storage devices (such as 116) each having an actuator (such as 160) operably disposed in a data storing and retrieving relationship with a data storage medium (such as 154). The data storage medium is part of a stack (such as 163) defining a total storage capacity. The medium is rotated by a motor (such as 156) at a speed of substantially greater than 10,000 RPM, and preferably at about 15,000 RPM. The total storage capacity of the stack is substantially greater than 100 gigabytes.

Preferably, the data storage devices are a 3.5 inch form factor with 85 mm discs. In this arrangement, each data storage device draws about 33 Watts of power during operation. The total storage capacity of each data storage device is 146 gigabytes. Thus, an MDA with twelve such data storage devices, as described previously in an alternative arrangement to that depicted in FIG. 4, has a total storage capacity of about 1.75 terabytes. In alternative equivalent embodiments the discs can be larger than 85 mm in diameter for increased storage capacity.

Embodiments of the present invention further contemplate a method for storing data in a distributed storage system. The method includes providing the plurality of data storage devices each having an actuator operably disposed in a data storing and retrieving relationship with a data storage medium rotating at a speed of substantially greater than 10,000 RPM, and wherein each of the data storage devices has a data storage capacity of substantially greater than 100 gigabytes. The method further includes placing the plurality of data storage devices in the multiple device array that is removably engageable in a cabinet for providing bulk storage to the distributed storage system. The method further includes forcing a fluid flow over each of the multiple device arrays for dissipating heat generated during operation of the data storage devices.

The providing step can be characterized by each data storage device having 85 mm discs rotating at 15,000 RPM in a 3.5 inch form factor drive. This arrangement provides a storage capacity of 146 gigabytes per drive, and consumes about 33 Watts of power during operation. To dissipate heat generated by the power load, the forcing a fluid flow step can be characterized by providing a dedicated fan for each of a plurality of multiple device arrays in the array storage system.

Consumer electronics devices employing one or more of the data storage devices, such as a personal video recorder, can also benefit from the enhanced heat dissipation provided by the airflow. In alternative equivalent arrangements discs with a diameter greater than 85 mm can be employed for even greater storage capacity, but with commensurate higher power usage.

Embodiments of the present invention further contemplate a distributed data storage system comprising a host, and means for transferring data to and from bulk storage in response to commands from the host. The means for transferring can be characterized by optimizing a data storage capacity of the bulk storage in an inverse relation to a spindle density of data storage devices forming the bulk storage. The means for transferring data can alternatively be characterized by paying a penalty of increased power consumption in return for optimized performance in terms of both processing speed and storage capacity. The means for transferring data can alternatively be characterized by storing data to and retrieving data from data storage discs that are about 85 millimeters diameter and spinning at about 15,000 revolutions per minute. The means for transferring data can alternatively be characterized by forced convection cooling of the bulk storage.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the number and size of data storage devices making up an MDA, without departing from the spirit and scope of the present invention.

In addition, although the embodiments described herein are directed to a data storage system, it will be appreciated by those skilled in the art that the claimed subject matter is not so limited and various other processing systems can utilize the embodiments of the present invention without departing from the spirit and scope of the claimed invention.

What is claimed is:

1. A data storage system comprising:
   a plurality of data storage devices each joined at proximal and distal ends to a carrier and each clearingly disengaged from the carrier at medial portions thereof to form a multiple device array (MDA) module such that the plurality is unitarily insertable in a shelf, the carrier and shelf cooperatively framing a conduit circumscribing the plurality of data storage devices and thereby defining outer transverse passages between the shelf and the medial portions of outermost rows of the plurality and inner transverse passages between medial portions facing each other in adjacent rows of the plurality;
   a fan imparting a fluid flow through both the outer and inner transverse passages in a convective heat transfer relationship with both opposing faces of each of the data storage devices; and
   wherein each data storage device has an actuator operably disposed in a data storing and retrieving relationship with a data storage medium rotating at a speed of substantially greater than 10,000 revolutions per minute and each data storage device has a data storage capacity of substantially greater than 100 gigabytes.

2. The data storage system of claim 1 wherein each data storage device comprises a 3.5 inch form factor.

3. The data storage system of claim 2 wherein each data storage medium comprises a data storage disc defining a diameter of about 85 millimeters.

4. The data storage system of claim 3 wherein each data storage device rotates the storage medium at about 15,000 revolutions per minute.

5. The data storage system of claim 4 wherein each data storage device comprises a data storage capacity of about 146 gigabytes.

6. The data storage system of claim 5 wherein each data storage device draws about 33 watts of power.

7. The data storage system of claim 1 comprising a data storage capacity of about 1.75 terabytes.

8. A method for storing data comprising:
   joining each of a plurality of data storage devices at proximal and distal ends to a carrier and each clearingly disengaged from the carrier at medial portions thereof to form a multiple device array (MDA) module such that the plurality is unitarily insertable in a shelf, the carrier and shelf operably framing a conduit circumscribing the plurality of data storage devices and thereby defining a outer transverse passages between the shelf and medial portions of outermost rows of the plurality and inner transverse passages between medial portions facing each other in adjacent rows of the plurality, each storage device having an actuator operably disposed in a data storing and retrieving relationship with a data storage medium rotating at a speed of substantially greater than 10,000 revolutions per minute and each data storage device having a data storage capacity of substantially greater than 100 gigabytes;
   inserting the MDA in the shelf; and
   forcing a fluid flow through both inner and outer transverse passages over both opposing faces of each of the data storage devices in the MDA for dissipating heat generated during operation of the data storage devices.

9. The method of claim 8 wherein the joining step is characterized by each data storage device comprising a 3.5 inch form factor.

10. The method of claim 9 wherein the joining step is characterized by each data storage device comprising data storage medium discs defining a diameter of about 85 millimeters.

11. The method of claim 10 wherein the joining step is characterized by each data storage device rotating the storage medium at about 15,000 revolutions per minute.

12. The method of claim 11 wherein the joining step is characterized by each data storage device comprising a data storage capacity of about 146 gigabytes.

13. The method of claim 11 wherein the joining step is characterized by each data storage device drawing about 33 watts of power.

14. The method of claim 10 wherein the joining step is characterized by each data storage device comprising data storage medium discs defining a diameter of greater than 85 millimeters.

15. The method of claim 10 wherein the forcing step is characterized by providing a dedicated fan for each of a plurality of multiple device arrays.

* * * * *